United States Patent [19]

Norris

[11] 4,268,287
[45] May 19, 1981

[54] APPARATUS FOR IMPROVING PARTICLE SEPARATOR EFFICIENCY

[75] Inventor: Richard M. Norris, Stratford, Conn.

[73] Assignee: Avco Corporation, Stratford, Conn.

[21] Appl. No.: 77,528

[22] Filed: Sep. 21, 1979

Related U.S. Application Data

[63] Continuation-in-part of Ser. No. 2,070, Jan. 8, 1979, abandoned.

[51] Int. Cl.³ .............................................. B01D 46/00
[52] U.S. Cl. ....................................... 55/306; 55/435; 55/440; 60/39.09 P
[58] Field of Search .................... 55/440, 435, 306; 60/39.09 P

[56] References Cited

U.S. PATENT DOCUMENTS

| | | | |
|---|---|---|---|
| 2,162,177 | 11/1937 | Laufer et al. | 428/464 |
| 3,148,043 | 9/1964 | Richardson et al. | 60/39.09 P |
| 3,362,155 | 1/1968 | Driscoll | 60/39.09 P |
| 3,634,118 | 1/1972 | Stokes | 106/171 |
| 3,778,983 | 12/1973 | Rygg | 55/306 |

*Primary Examiner*—Bernard Nozick
*Attorney, Agent, or Firm*—Ralph D. Gelling

[57] ABSTRACT

The inlet and primary impingement surfaces of a particle separator used in a gas turbine engine are coated with a composition consisting substantially of cellulose nitrate.

1 Claim, 1 Drawing Figure

APPARATUS FOR IMPROVING PARTICLE SEPARATOR EFFICIENCY

BACKGROUND OF THE INVENTION

This application is a continuation-in-part of application Ser. No. 002,070, filed Jan. 8, 1979, now abandoned.

A particle separator device is used to prevent the ingestion of sand and other similar particles into the inlet of a gas turbine engine or other device. Such devices generally deflect the inlet airflow and utilize the higher inertia of the sand particles within the bending airstream, to direct these particles away from the inlet and trap them in an enclosed area for later removal or dumping. It has been found that sand particles entering and impinging on the surfaces of the inlet and the guide vanes of the particle separator system may bounce in a random fashion, thereby hindering the optimum efficiency of the separator system. It is the object of this invention to construct a compliant surface on the impingement walls of the separator system to inhibit random bounding and increase the separation efficiency.

DESCRIPTION OF THE DRAWING

The invention is described in more detail below with reference to the drawing and in said drawing

DESCRIPTION OF THE INVENTION

Figure 1:
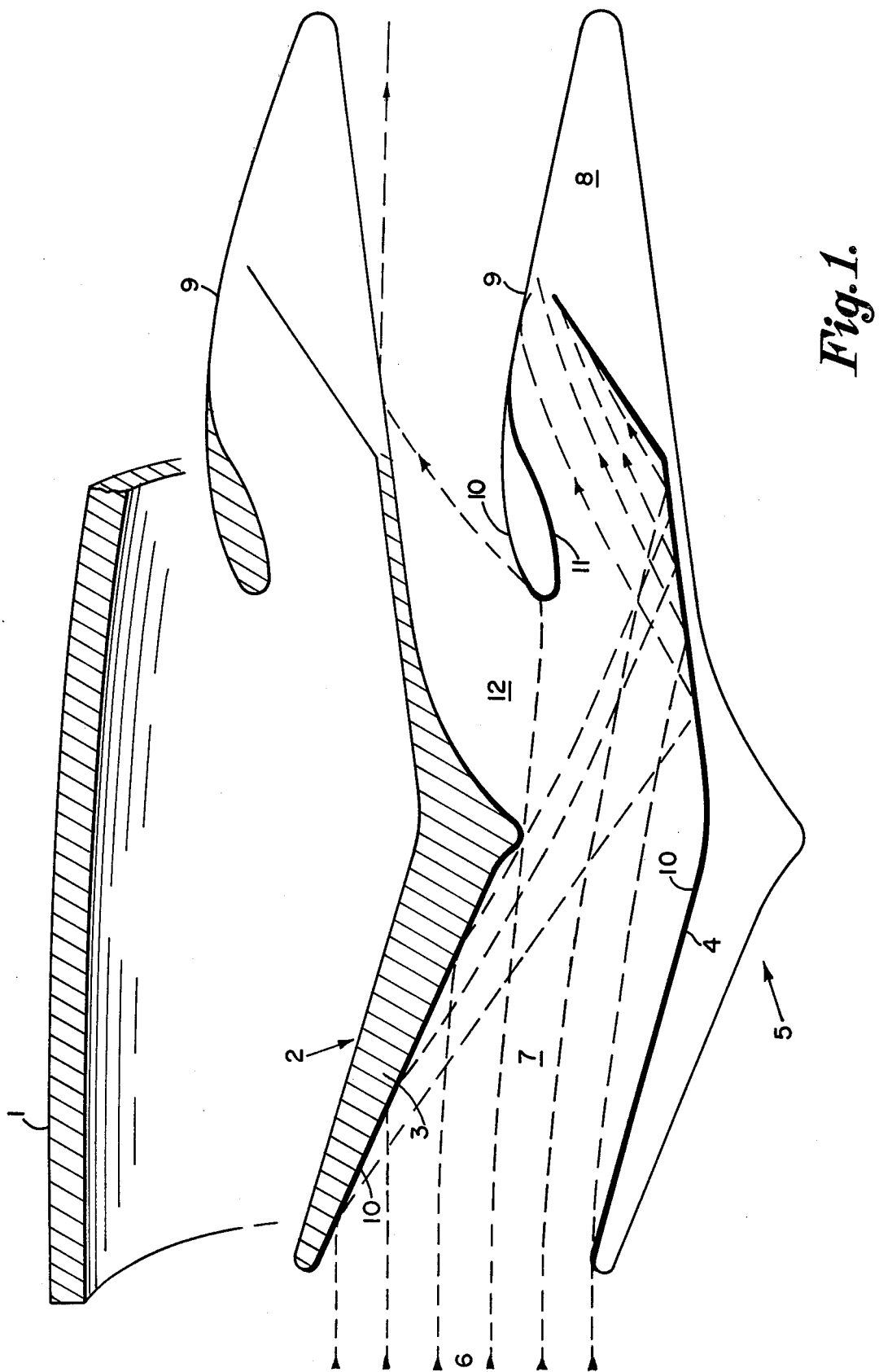
FIG. 1 is a schematic view of a pair of vanes of a typical particle separation system employing the coating of this invention.

FIG. 1 shows the inlet of a particle separator system of a gas turbine engine. The system is enclosed in housing 1 and inertial separation is caused by deflecting vanes 2. The vanes 2 deflect the airflow and cause it to bend through a substantial angle at throat 12. The particles of greater mass are forced to the outside of the bend and are divided by surface 11 into the trap 8 formed by wall 9. Surface 3 of vane 2, in association with surface 4 of adjacent vane 5, define a bending channel 7 for the air flow entering the particle separator system. Sand particles indicated by arrows 6, enter the channel 7 and impinge on surface 3 and proceed down the channel 7. The airflow to the engine inlet plenum (not shown) must make the bend at throat 12. The particles of heavier mass are forced by inertia to the outside of the bending airflow where they are divided out by surface 11 and are trapped in receptacle 8. The trap 8 is formed in the trailing edge of the vane and is generally formed by hooked shaped wall portion 9. Particle separators of the type described are relatively well-known, and a specific example is described in detail in U.S. Pat. No. 3,970,439. Typically, this type of system is approximately 80% efficient in a sand environment. Part of this lack of efficiency is caused by random bouncing of the sand particles. This is believed to be due to some extent to the lack of symmetry in the shape of the individual particles. In order to limit the random bouncing, a compliant coating 10 is applied to the primary impingement surfaces; namely, surfaces 3, 4, and 11. Test results have indicated that the application of this coating increases the sand collection efficiency by 6 to 10 percent.

The compliant reaction of the coating in this instance seems to involve plastic deformation upon impact with the sand particles. This deformation absorbs the impact of the sand and reduces its energy. The specific coating also acts as a gel or viscous liquid and creates a surface having a low coefficient of friction which will further reduce bounce and reduce the angle of reflection of the particle. The overall effect is to reduce the normal, high bouncing action of the sand particles and therefore to urge such particles to flow more in conformance with the airstream. This enhances the inertial separation effect and substantially reduces the particles which escape the trap 8.

This coating consists predominantly of cellulose nitrate contained in an appropriate medium which promotes adherence to the metal surfaces of the particle separator system. This coating presents a pliable surface to the same particles that is capable of absorbing part of the energy of the sand at impact and results in less bouncing of the particle. The application of a standard machine bluing consisting of cellulose nitrate contained in a lacquer that is solvent in alcohol works consistently well. Steel blue DX100 manufactured by Di Kem Company is an example of such a product. In general, these products are meant to be used to reduce glare on metal surfaces. The use of this type of coating for this application produces a new and surprising result.

The inventor claims:

1. A system for separating particles from an airflow comprising:
   a duct having a passage constructed therein to direct the airflow in the desired path;
   at least one deflecting surface fixed in the duct in the path of the airflow to deflect said airflow through an angle, thereby creating an inertial separation effect for particles of high mass within the airflow;
   means mounted in the duct downstream of the deflecting surface constructed with a wall positioned and shaped to divide the particles of greater inertia within the airflow; and
   a compliant coating applied to those portions of the deflecting surface and the dividing wall to form a compliant surface having a low coefficient of friction directly exposed to impingement by the airflow, said coating comprising significant amounts of cellulous nitrate contained in a medium which promotes adherence to the surfaces of the particle separation system.

* * * * *